United States Patent [19]

Lipton

[11] Patent Number: 5,181,133
[45] Date of Patent: Jan. 19, 1993

[54] DRIVE METHOD FOR TWISTED NEMATIC LIQUID CRYSTAL SHUTTERS FOR STEREOSCOPIC AND OTHER APPLICATIONS

[75] Inventor: Lenny Lipton, Greenbrae, Calif.

[73] Assignee: StereoGraphics Corporation, San Rafael, Calif.

[21] Appl. No.: 700,558

[22] Filed: May 15, 1991

[51] Int. Cl.⁵ .......................... G02F 1/13; G09G 3/00
[52] U.S. Cl. ........................ 359/84; 359/55; 340/805; 358/88
[58] Field of Search ............ 359/54, 55, 84, 102; 340/784, 805, 767, 713; 358/88, 92

[56] References Cited

U.S. PATENT DOCUMENTS

| | | | |
|---|---|---|---|
| 4,021,846 | 5/1977 | Roese | 359/55 |
| 4,523,226 | 6/1985 | Lipton et al. | 358/88 |
| 4,566,758 | 1/1986 | Bos | 359/92 |
| 4,582,396 | 4/1986 | Bos et al. | 359/93 |
| 4,792,850 | 12/1988 | Lipton et al. | 358/92 |
| 4,842,400 | 6/1989 | Klein | 359/84 |
| 4,884,876 | 12/1989 | Lipton et al. | 359/93 |
| 4,907,860 | 3/1990 | Noble | 359/84 |
| 4,967,268 | 10/1990 | Lipton et al. | 358/92 |

OTHER PUBLICATIONS

P. J. box, P. A. Johnson, Jr., & K. R. Koehler/Beran, "A Liquid-Crystal Optical-Switching Device (Pi Cell)", *SID 83 Digest*, pp. 30-31.

Primary Examiner—William L. Sikes
Assistant Examiner—Huy K. Mai
Attorney, Agent, or Firm—Limbach & Limbach

[57] ABSTRACT

A method for overcoming optical artifacts which are an intrinsic part of the performance of twisted nematic liquid crystal shutter devices. When power is shut off from a conventional shutter device of this type, the device exhibits a brief periodic flickering called "bounce". When the power is turned on, the device exhibits a similar flickering effect, known as "stumble." When a pair of such devices are used as lenses in a stereoscopic selection apparatus, these artifacts, which contribute nothing to the device's performance, are obtrusive and disturbing to the user. By carefully controlling the voltage to each shutter in accordance with the invention while turning the shutter on or off, these artifacts are eliminated or substantially reduced.

23 Claims, 3 Drawing Sheets

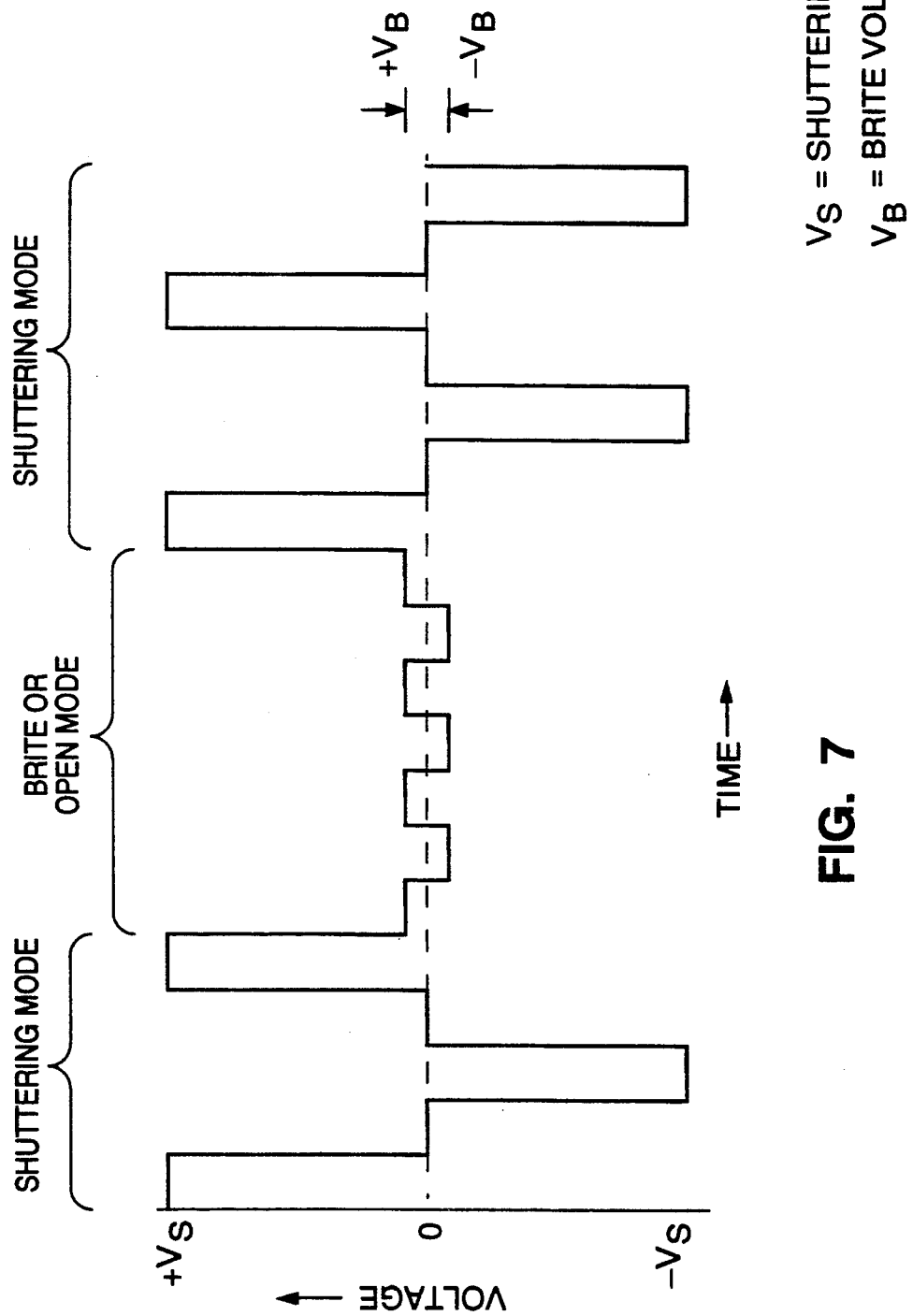

DRIVE METHOD FOR TWISTED NEMATIC LIQUID CRYSTAL SHUTTERS FOR STEREOSCOPIC AND OTHER APPLICATIONS

FIELD OF THE INVENTION

The invention is a method for electronically driving twisted nematic (TN) liquid crystal (LC) shutters to eliminate electro-optical effects which interfere with the usefulness of the shutters when used in a stereoscopic selection device, or in other applications.

BACKGROUND OF THE INVENTION

The commonly used electro-optical shutter for high quality electro-stereoscopic applications is the surface mode or $\pi$-cell LC device. It is preferred because it has superior speed, particularly for the transition from its occluded to transmissive state. However, there are stereoscopic display applications for which the slower twisted nematic liquid crystal ("TN LC" or "TN") device is adequate; for some products the speed of the surface mode device may not be required. For example, for a video toy or game, in which a flickering 30 field/second/eye system is employed, the use of a slower shutter results in a reduction in brightness, which may be of help reducing the user's perception of flicker. In addition, there are means for improving the speed of the TN device, a description of which is beyond the scope of this disclosure. One possible approach may be found in Bos, U.S. Pat. No. 4,566,758. However, we have not tested the devices described in U.S. Pat. No. 4,566,758 in a stereoscopic application.

The present disclosure is concerned with methods for the elimination of TN artifacts which produce an unpleasant visual effect for the user. The term "artifact" may not be entirely appropriate, since these effects are an intrinsic part of the electro-optical characteristics and performance of the TN device. Nevertheless, we will continue to call them artifacts, since they are undesirable for the application contemplated here; as a shutter in a stereoscopic selection device. These artifacts are "stumble" and "bounce", which, respectively, produce a flickering effect when the selection device, hence the shutter, is turned on and off.

Electronic stereoscopic displays have gained acceptance to a great extent because of the success of the CrystalEyes ® product described in U.S. Pat. No. 4,884,876 and U.S. Pat. No. 4,967,268 by Lipton et al. '876 describes a high performance LC shutter with means for driving it in a power efficient manner. '268 describes an infrared (IR) communications link to synchronize the eyewear's shutters with the video refresh rate. Another reason for the growing acceptance of stereoscopic electronic imaging is described in Lipton et al. U.S. Pat. No. 4,523,226 which provides the basis for producing a flickerless stereoscopic display; the technique is used by many manufacturers of computer graphics workstations and PC graphics boards.

FIG. 1 shows the set up for using the CrystalEyes ® product. An IR emitter is located on the display monitor. The left/right control signal from the electronic imaging source, typically a "stereo-ready" graphics computer (not shown), is fed to the emitter which broadcasts IR signals (dotted lines) containing encoded sync information. This information is received by the CrystalEyes ® eyewear worn by the user and is used to synchronize the eyewear's shutters to the video field rate. The appropriate eye will then see its appropriate perspective viewpoint, and not the unwanted view, and the result will be the perception of a stereoscopic image.

FIG. 2 shows a preferred embodiment of the CrystalEyes ® eyewear. The eyewear is powered by on-board lithium batteries which provide electric energy for a flex circuit (which incorporates a custom integrated circuit) which is used to drive the LC shutters (lenses). An IR sensor located in the front of the eyewear sees the IR signal broadcast by the emitter and uses this information to open and close the LC shutters in sync with the video field rate.

The LC lenses which are employed in the CrystalEyes ® product as described in the '876 patent are preferably surface mode cells, which have good performance for stereoscopic application, but these are not the only kind of LC shutter which may be used. A viable alternative for certain applications, as stated above, is the TN device.

The TN device suffers from two drawbacks. As stated above, one phenomenon we call stumble, and the other is called bounce. In the case of stumble, when the eyewear is turned on, the shutters flicker for a moment, usually less than a second. In the case of bounce, when the eyewear is turned off, there is flicker. A clean transition from on to off or off to on, in which there is no flickering, is greatly to be preferred. This transition of the shutter in periodic bursts, in which there is unwanted modulation of light, is disturbing to the user.

Bounce has been discussed in the literature, in particular, in Bos et al., "A Liquid-Crystal Optical-Switching Device ($\pi$ Cell)," SID Digest, 1983, pp. 30–31.

Concerns about stumble and bounce are raised by the need for the CrystalEyes ® product (using surface mode shutters) to incorporate means for keeping the shutters functioning when the eyewear is turned away from the IR emitter. In this case the IR sensor in the eyewear cannot see the IR signal (and thus, cannot be maintained in its normal shuttering mode by the IR signal). However, even if the IR sensor cannot see the IR signal, the shutters must continue to operate as shutters to prevent their falling into the rest state. Unlike the TN shutter, which has two states (open and closed) the surface mode device has a third state which occurs a few seconds after the shutter ceases to be powered. More information about this characteristic of the surface mode device may be found in aforementioned article by Bos et al.

In brief, surface mode shutters operate through a birefringent effect which persists when voltage is not applied to the device. This birefringence is responsible for coloration of the shutter. The effect is well known and may be illustrated by crumpling cellophane (which is birefringent) and placing it between two sheets of linear polarizer with crossed axes. TN cells on the other hand, operate according to the principal of optical activity, and the spiral orientation of the molecules, necessary for the toggling of the axis of polarization to achieve transmission, needs no voltage.

In the rest state, the surface mode shutter becomes colored—depending upon the thickness and type of the nematic liquid it may (for example) appear green, purple, or yellow. Such coloration is obtrusive to the user and it is necessary to keep the surface mode shutter shuttering by means of an internal oscillator, so that it will have a neutral transmission.

An alternative mode is to hold the surface mode shutter in the open state, which is needed for users looking at documents, for making notes, or looking at monitors not operating in the stereoscopic mode. This open state can be achieved by applying the square wave waveform shown in FIG. 5 to the shutter (at times when the shutter does not receive the IR control signal intended to maintain it in its normal shuttering mode). By providing the FIG. 5 signal with a peak-to-peak voltage of two to eight volts, the surface mode shutter will remain in its transmissive mode.

The concern of the present invention is the operation of TN devices. The specification will disclose means to successfully employ a TN device. As mentioned, the TN device has two states; it is in one such state when a voltage is applied (the closed state), and the other when no voltage is applied (the open state). FIG. 3 shows the typical construction of a conventional TN shutter, with the TN LC cell sandwiched between two linear sheet polarizers whose axes (PA1 and PA2) are orthogonal. The axes of the facing inside surfaces of the cell are rubbed orthogonally and the sheet polarizer juxtaposed with each glass surface of the cell has its axis aligned parallel with the rub direction of the juxtaposed piece of glass.

Given such construction, the TN device will be transmissive (open) with no voltage applied across the LC cell, and closed when voltage source V (shown in FIG. 3) applies a voltage across it. As an alternative to the continued shuttering of the TN LC device (under control of an oscillator) at times when no IR sensor in the eyewear receives an IR control signal (for maintaining the TN shutter in a normal shuttering mode), the power could be turned off to the TN shutter in the absence of the IR control signal, to cause the shutter to make a transition to a stable open state. However, if this is done the TN exhibits stumble and bounce.

If the shutter of a conventional TN device (mounted in eyewear) is turned off when a user wearing the eyewear turns away from an IR control signal emitter, the user will experience bounce or flicker annoyingly for a moment. When the shutter is turned on again (when the user faces the IR control signal emitter), it will momentarily stumble or flicker distractingly, before it resumes the normal shuttering mode. The invention provides a means for the elimination of these undesirable effects so that the function of the selection device will be transparent to the user.

BRIEF DESCRIPTION OF THE DRAWINGS

FIG. 7 is a waveform used in a preferred embodiment of the invention to drive a TN shutter, to eliminate bounce upon a transition from a shuttering state to an open state, and to eliminate stumble upon a transition from the open state back to the shuttering state.

DESCRIPTION OF THE PREFERRED EMBODIMENTS

Figure 4:
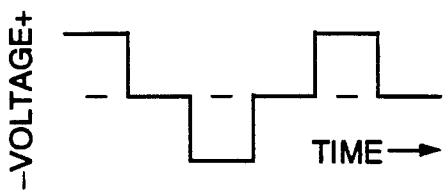
FIG. 4 is a graph of a stairstep waveform useful for driving a TN shutter.

In the conventional CrystalEyes ® product, or similar electronic stereoscopic selection device using LC devices, the shutters must open and close in synchrony with the video field rate as explained above. FIG. 4 shows the waveform of the voltage which is conventionally applied to LC shutters. (For this and all subsequent figures voltage is in the vertical direction, and time in the horizontal.) The FIG. 4 waveform is sometimes called a stairstep. The waveform is symmetrical about the x-axis (the axis representing zero voltage), i.e., it has as much voltage in the positive as in the negative direction. The integrated DC voltage over a period of time is zero to prevent deterioration of the LC cell. The voltage, within limits, determines the shutter's speed and extinction.

A TN shutter, when constructed as described above with reference to FIG. 3, is open (transmissive) in the zero voltage state and closed in the high voltage state. Any departure from zero voltage produces a loss in performance for a stereoscopic application (that is, the shutter's transmission will be reduced or the color of the light passing through the shutter will no longer be neutral, but rather colored). This is different from the manner in which a surface mode shutter device operates. A surface mode shutter requires a low voltage to produce the maximum transmission. Thus, to drive a surface mode shutter, the zero voltage portion of the FIG. 4 waveform would need to be replaced by low amplitude voltage portion.

As mentioned above, when the user of the CrystalEyes ® product, looks away from the screen (monitor/IR emitter), an oscillator/driver in the eyewear is required to keep both shutters shuttering (in the case that surface mode lenses are employed). As an alternative, the oscillator/driver may apply a low voltage square wave (shown in FIG. 5) to both the left and right shutters to maintain both shutters in an open state. In the case of the crystalEyes ® product, this low voltage has been made user selectable to allow the user to see through the shutters without the duty cycle. This results in an approximate doubling of the transmission of light for viewing written material, or for looking at monitors which are not stereoscopic.

In the case that TN shutters would be substituted for surface mode shutters in the CrystalEyes ® eyewear, no voltage would be required to achieve this open mode. However, instead of a seamless transition from shuttering to the open state and from the open state to the shuttering state, stumble and bounce would result.

Figure 1:
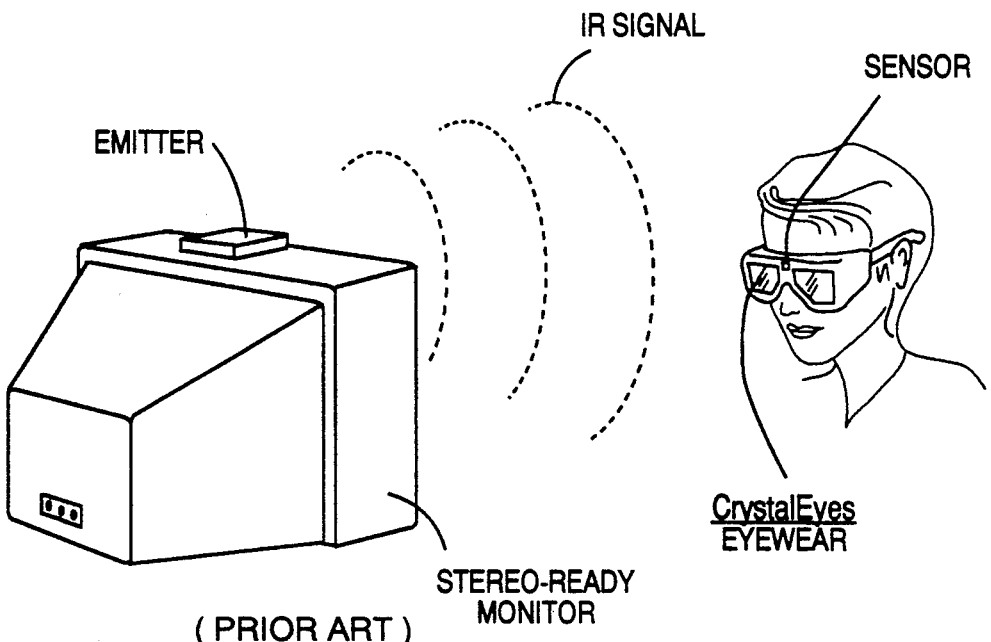
FIG. 1 is a perspective view of a conventional system employing the CrystalEyes ® selection device for viewing electronic images.
Figure 2:
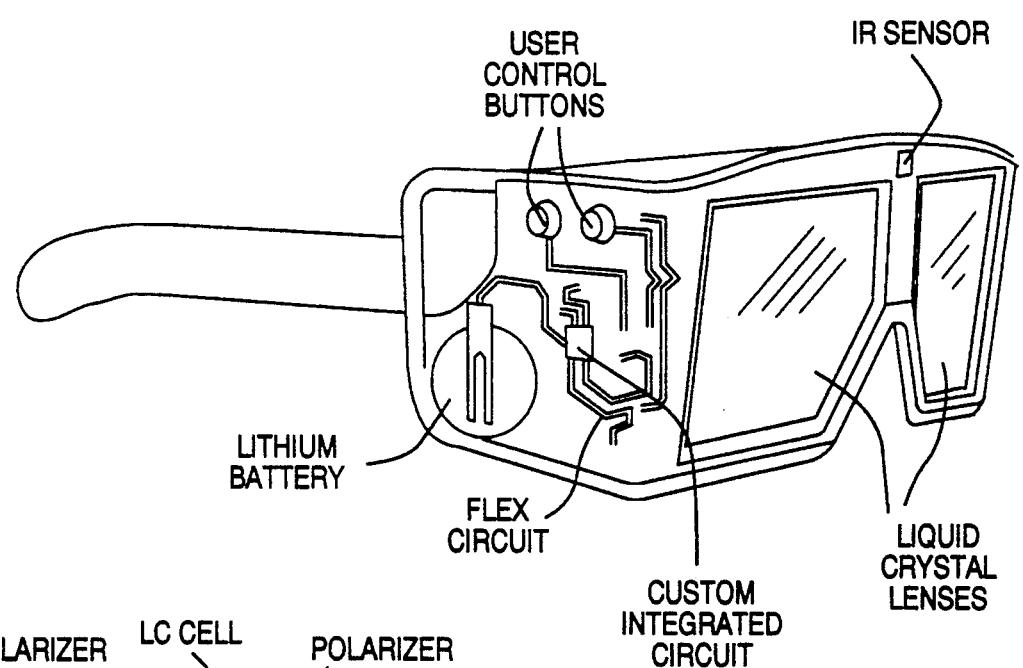
FIG. 2 is a perspective view (partially cut away) of a conventional electronic stereoscopic selection device.
Figure 3:
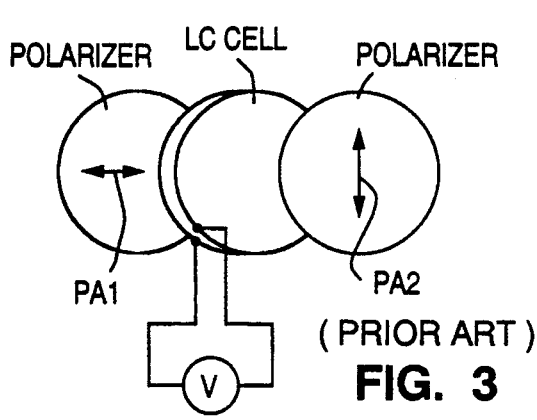
FIG. 3 is an exploded perspective view of a conventional TN shutter.
Figure 5:
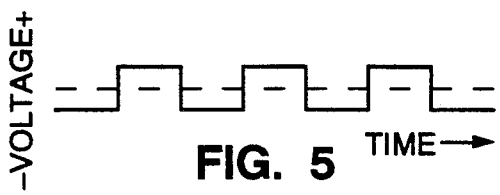
FIG. 5 is a waveform useful for driving a TN shutter in its open mode.

The invention provides a solution to this latter problem. The solution for the problem is not obvious, because TN shutters used in display products are open (when constructed as shown in FIG. 3) when they are off (when no voltage is applied to them). The invention is based on the inventor's recognition that when a low voltage (i.e., positive or negative voltage in the range from one to three volts) is applied as a square wave waveform (as shown in FIG. 5), rather than zero voltage, stumble and bounce will not be present, or will be greatly reduced.

Figure 5A:
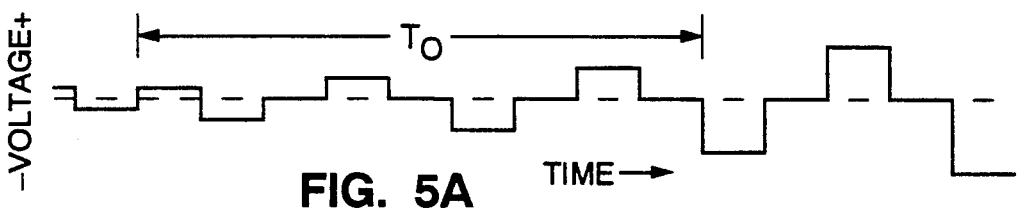
FIG. 5A is a waveform used in a preferred embodiment of the invention to drive a TN shutter, to eliminate stumble when converting the shutter from an open state to a shuttering state.

Therefore, in accordance with the invention, a signal such as that shown in FIG. 5A is applied to a TN shutter to convert the shutter from an open state to a shuttering state. The shutter is maintained in the open state by the voltage applied before transition period $T_o$ (i.e., the low voltage signal appearing to the left of period $T_o$ in the FIG. 5A graph), and in the shuttering state by the high voltage applied after the transition period (the voltage to the right of period $T_o$ in FIG. 5A). The transition period $T_o$ should have duration less than one second.

The peak-to-peak amplitude of the low voltage portion of the FIG. 5A signal is typically in the range 1 to 6 volts, and the peak-to-peak amplitude of the high voltage portion is substantially higher (typically in the range from 30 to 45 volts).

The envelope of the FIG. 5A signal has monotonically increasing amplitude during each transition period (i.e., the amplitude may increase or remain constant over portions of the transition period, but never decreases during any portion of the transition period). The FIG. 5A signal implements a transition to the high amplitude waveform shown in FIG. 4 (used for shuttering operation) from the low amplitude waveform shown in FIG. 5 (which maintains the shutter in an open state at times when the IR sensor does not receive an IR control signal from an IR emitter).

The waveform shown in FIG. 5A, when used with TN shutters for this purpose, eliminates (or drastically reduces) stumble when making the transition from an open to a shuttering state. A time reversed version of the FIG. 5A signal can be used to effect the inverse transition, from a shuttering state to an open state, in a manner eliminating or drastically reducing bounce.

A preferred embodiment of the invention will next be described with reference to FIG. 7. The FIG. 7 embodiment eliminates or drastically reduces bounce upon the transition of a TN shutter from a shuttering state to an open state (such as when eyewear including the TN shutter is turned away from an IR emitter, thereby interrupting reception of emitted IR control signals which had maintained the shutter in a normal shuttering state). The FIG. 7 embodiment also eliminates or drastically reduces stumble upon the shutter's transition from the open state back to the shuttering state (such as when eyewear including the shutter is turned back toward the IR emitter).

In the FIG. 7 example, the TN shutter is initially maintained in a shuttering mode by the high voltage signal having peak-to-peak amplitude 2 $V_s$. Then, when a user wearing eyewear in which the shutter is mounted turns away from the IR emitter (so that the shutter is no longer maintained in a shuttering mode by an IR control signal), the shutter undergoes a transition from the shuttering mode to an open mode (sometimes referred to as a "brite" mode) in which the low voltage signal shown in FIG. 7 having peak-to-peak amplitude 2 $V_B$ is applied thereto. The peak-to-peak low amplitude 2 $V_B$ is typically in the range from about 2 volts to about 4 volts, and the peak-to-peak high amplitude $V_s$ is typically in the range from about 30 volts to about 45 volts.

Then, when the user faces the IR emitter (so that the shutter once again receives an IR control signal), the shutter undergoes a transition from the open mode to the shuttering mode, and the high voltage signal having peak-to-peak amplitude 2 $V_s$ is again applied to the shutter to maintain it in the shuttering mode.

Preferably, the time-averaged amplitude of the FIG. 7 signal is substantially equal to zero.

Figure 6:
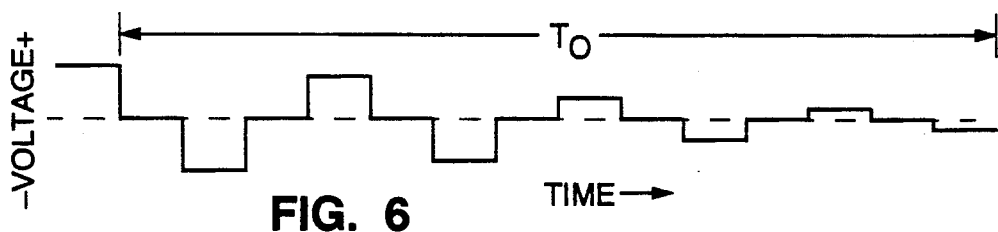
FIG. 6 is a waveform used in a preferred embodiment of the invention to drive a TN shutter to eliminate bounce when converting the shutter from a shuttering state to an open state.
Figure 6A:
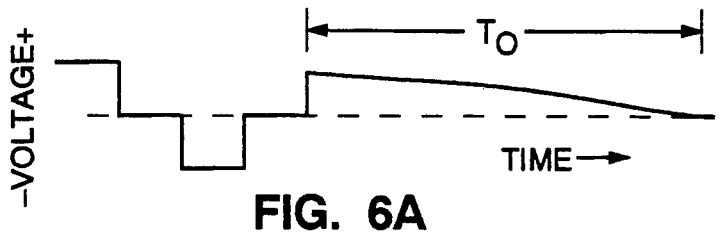
FIG. 6A is a waveform used in an alternate embodiment of the invention for the elimination of bounce.

Problems with bounce also occur when TN shutters are turned off. If the user pushes the "off" button of a pair of spectacles in which TN shutters are mounted, the TN shutters in the eyewear tend to exhibit a nervous, flickering, bounce effect. In accordance with the invention, this problem can be cured by rolling off (or reducing) the shuttering waveform's peak-to-peak amplitude to zero over a controlled period of time $T_o$ as shown in FIG. 6 or 6A. By reducing the voltage in a controlled fashion (within a period $T_o$ less than one second), by reducing the amplitude of a stairstep waveform (as shown in FIG. 6) or by simply rolling off the voltage (as shown in FIG. 6A), the phenomenon of bounce is eliminated or drastically reduced. The optimum rolloff time $T_o$ is determined empirically.

Each of the waveforms 5A, 6 and 6A represents a signal for driving a single TN shutter. Typically, eyewear for viewing field-sequential stereoscopic images will include a right shutter and a left shutter. The left shutter is driven by a signal that is 180° out of phase with respect to the signal driving the right shutter. The two out-of-phase signals will each have the same waveform, which (when implementing the invention) can be the waveform shown in FIGS. 5A, 5 or 6A.

Various recommendations have been made in the above disclosure which a person ordinarily skilled in the art would be expected to use as a basis for making minor and obvious variations. Such variations are considered to be within the scope of the invention, as claimed below.

What is claimed is:

1. A method for driving a shutter including a twisted nematic liquid crystal cell, between a low voltage state in which a low peak-to-peak voltage signal is applied to the cell, and a shuttering state in which a high peak-to-peak voltage signal is applied to the cell, said method including the steps of:
    (a) applying a first one of the low peak-to-peak voltage signal and the high peak-to-peak voltage signal to the cell;
    (b) then, applying a transition signal to the cell for a transition period, where the transition signal has an envelope whose amplitude varies monotonically over the transition period; and
    (c) then, applying the other of the low peak-to-peak voltage signal and the high peak-to-peak voltage signal to the cell.

2. The method of claim 1, wherein the low peak-to-peak voltage signal is a square wave signal.

3. The method of claim 2, wherein the square wave signal is applied to the cell during step (a).

4. The method of claim 2, wherein the high peak-to-peak voltage signal is applied to the cell during step (a).

5. The method of claim 2, wherein the peak-to-peak amplitude of the square wave signal is in the range from about two volts to about six volts.

6. The method of claim 1, wherein the low peak-to-peak voltage signal has substantially zero amplitude, and wherein the high peak-to-peak voltage signal is applied to the cell during step (a).

7. The method of claim 1, wherein the high peak-to-peak voltage signal has a stairstep waveform, and wherein the low peak-to-peak voltage signal is a square wave signal having peak-to-peak amplitude in the range from about two volts to about six volts.

8. A method for driving a twisted nematic liquid crystal shutter apparatus from a shuttering state in which a high voltage signal is applied to the apparatus, to a low voltage state in which a low voltage signal is applied to the apparatus, in a manner substantially reducing bounce artifacts that would result from a sudden transition from the shuttering state to the low voltage state, said method including the steps of:
  (a) applying the high voltage signal to a twisted nematic liquid crystal cell within the apparatus, wherein the high voltage signal has a high peak-to-peak voltage; and
  (b) then, applying the low voltage signal to the twisted nematic liquid crystal cell, wherein the low voltage signal has a low peak-to-peak voltage.

9. The method of claim 8, wherein the low peak-to-peak voltage is a non-zero voltage.

10. The method of claim 8, wherein the shutter apparatus includes a first twisted nematic liquid crystal cell and a second twisted nematic liquid crystal cell, and wherein:
  step (a) includes the step of applying the high voltage signal to the first cell and a second high voltage signal to the second cell, wherein the high voltage signal and the second high voltage signal have substantially opposite phase but substantially identical waveforms; and
  step (b) includes the step of applying the low voltage signal to the left cell and a second low voltage signal to the right cell, wherein the low voltage signal and the second low voltage signal have substantially opposite phase but substantially identical waveforms.

11. The method of claim 8, also including the step of:
  (c) after step (a) but before step (b), applying a transition signal to the twisted nematic liquid crystal cell for a transition period having duration less than about one second, wherein the transition signal has an envelope of nonincreasing amplitude over the transition period, and wherein the nonincreasing amplitude decreases from the high peak-to-peak voltage to the low peak-to-peak voltage during the transition period.

12. The method of claim 11, wherein the shutter apparatus includes a first twisted nematic liquid crystal cell and a second twisted nematic liquid crystal cell, and wherein:
  step (a) includes the step of applying the high voltage signal to the first cell and a second high voltage signal to the second cell, wherein the high voltage signal and the second high voltage signal have substantially opposite phase but substantially identical waveforms;
  step (b) includes the step of applying the low voltage signal to the left cell and a second low voltage signal to the right cell, wherein the low voltage signal and the second low voltage signal have substantially opposite phase but substantially identical waveforms; and
  step (c) includes the step of applying the transition signal to the first cell and a second transition signal to the second cell, wherein the transition signal and the second transition signal have substantially opposite phase but substantially identical waveforms.

13. The method of claim 8, wherein the low voltage signal is a square wave signal.

14. The method of claim 13, wherein the low peak-to-peak voltage is in the range from about two volt to about six volts.

15. The method of claim 13, wherein the high voltage signal has a stairstep waveform.

16. The method of claim 8, also including the steps of:
  after step (b), applying a second high voltage signal to the twisted nematic liquid crystal cell, wherein the second high voltage signal has said high peak-to-peak voltage.

17. A method for driving a twisted nematic liquid crystal shutter apparatus from a transmissive state in which a low voltage signal in which a low voltage signal is applied to the apparatus, to a shuttering state in which a high voltage signal is applied to the apparatus, in a manner substantially reducing stumble artifacts that would result from a sudden transition to the shuttering state from the transmissive state, said method including the steps of:
  (a) applying the low voltage signal to a twisted nematic liquid crystal cell within the apparatus, wherein the low voltage signal has a low peak-to-peak voltage; and
  (b) then, applying the high voltage signal to the twisted nematic liquid crystal cell, wherein the high voltage signal has a high peak-to-peak voltage.

18. The method of claim 17, also including the step of:
  (c) after step (a) but before step (b), applying a transition signal to the twisted nematic liquid crystal cell for a transition period having duration less than about one second, wherein the transition signal has an envelope of nondecreasing amplitude over the transition period, and wherein the nondecreasing amplitude increases from the low peak-to-peak voltage to the high peak-to-peak voltage during the transition period.

19. The method of claim 17, wherein the shutter apparatus includes a first twisted nematic liquid crystal cell and a second twisted nematic liquid crystal cell, and wherein:
  step (a) includes the step of applying the low voltage signal to the first cell and a second low voltage signal to the second cell, wherein the low voltage signal and the second low voltage signal have substantially opposite phase but substantially identical waveforms; and
  step (b) includes the step of applying the high voltage signal to the first cell and a second high voltage signal to the second cell, wherein the high voltage signal and the second high voltage signal have substantially opposite phase but substantially identical waveforms.

20. The method of claim 17, wherein the low voltage signal is a square wave signal.

21. The method of claim 20, wherein the low peak-to-peak voltage is in the range from about two volts to about six volts.

22. The method of claim 20, wherein the high voltage signal has a stairstep waveform.

23. The method of claim 17, also including the step of:
  after step (b), applying a second low voltage signal to the twisted nematic liquid crystal cell, wherein the second low voltage signal has said low peak-to-peak voltage.

* * * * *